Oct. 6, 1964 R. E. KAMINSKI 3,151,803
REUSABLE MAILING DEVICE
Filed May 29, 1962
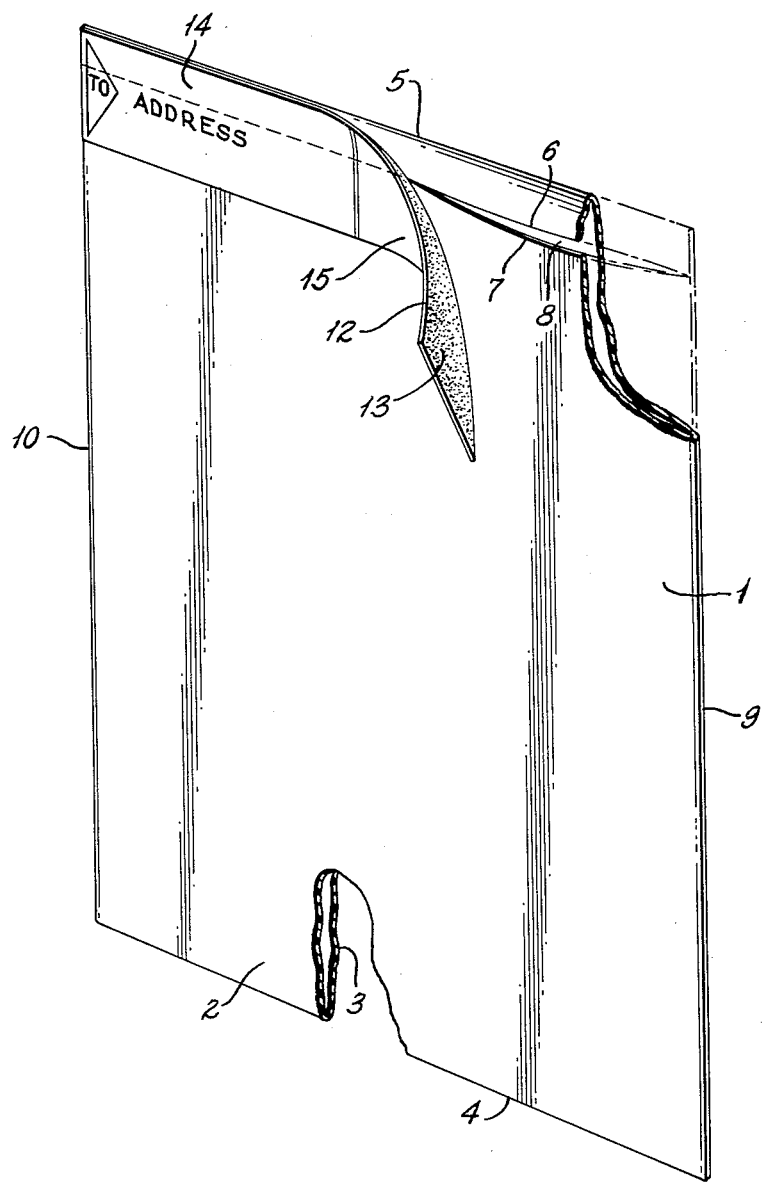
INVENTOR
Raymond E. Kaminski 3,151,803
REUSABLE MAILING DEVICE
Raymond E. Kaminski, Harwood Heights, Ill., assignor to International Minerals & Chemical Corporation, a corporation of New York
Filed May 29, 1962, Ser. No. 198,557
1 Claim. (Cl. 229—80)

This invention relates to a mailing device and more particularly to a reusable mailing envelope combined with an economically replaceable sealing strip, the strip having an area for applying identification of the addressee, postage, etc.

The business of most present day commercial firms requires that they carry on a great deal of correspondence which necessitates the use of many envelopes. Since much of this correspondence is carried on with the same people, considerable money could be saved by using a simple, inexpensive reusable mailing device capable of being sent back and forth. The envelopes generally available on the market today are not reusable and thus must be disposed of after one use. Over an extended period of time, the cost of these envelopes amounts to a considerable expense. In addition, most of the presently available envelopes are difficult to open, in that they usually must be torn or cut open.

While prior reusable mailing devices have been devised, none has proved completely satisfactory. Some such prior art mailing devices are reusable only for a limited number of times since neither stamps nor addresses placed thereon are removable once they have been affixed. Other available reusable mailing devices are of relatively complex construction requiring, for example, that a sealing strip be inserted through slots in an envelope to close the envelope flap.

To overcome the disadvantages of prior art mailing devices, it is an object of this invention to provide an improved mailing device embodying a durable envelope which may be reused a substantial number of times and having an economically replaceable portion to bear identification of the addressee, postage, etc., such mailing device being simple and inexpensive in construction.

A further object of the invention is to provide an improved mailing device in which the envelope is closed by an easily removable sealing strip, the sealing strip being adapted to provide a surface to receive identification of the addressee and postage for the envelope so that upon removal of the strip the envelope subsequently may be reused.

A still further object of the invention is to provide such an improved reusable mailing device in which the envelope is closed by a sealing strip having a pressure sensitive adhesive material thereon, thus permitting easy application and removal of the strip from the envelope.

Broadly the invention embraces a reusable mailing device comprising an envelope having an opening therein to permit access to the interior thereof, and an easily removable sealing strip, with the strip having adhesive material thereon to affix it in closing relation with the opening. This strip also provides a surface having an area to receive identification of the addressee for said envelope. Preferably the opening comprises a longitudinal slit in one wall of the envelope. The sealing strip also may have a second area on which postage for the envelope can be mounted.

The invention having been generally described, a preferred specific embodiment will now be discussed in detail with reference to the accompanying drawing in which:

The figure is a perspective view of a reusable mailing device constructed according to the principles of the present invention, showing portions of the envelope broken away and the sealing strip partially affixed.

The body 1 of the envelope is formed from a durable, light weight material such as plastic, although any other suitable durable material may be used. Preferably the body 1 comprises a one piece blank folded to form a front wall 2, a back wall 3, a bottom edge 4 and a top edge 5. The ends 6 and 7 of the blank are in abutment on the front wall 2 of the envelope to form an opening 8 permitting access to the interior thereof.

The side edges 9 and 10 are closed by any suitable means to complete the formation of the body 1 of the envelope. In the case of plastic material, the side edges 9 and 10 may conveniently be closed by means of hermetically sealed seams.

While the opening 8 is shown on the drawing as a longitudinal slit adjacent the top edge 5, it may have a curved or other configuration and may be located in other positions on the envelope such as in the center of one of the walls 2 or 3 or on one of the edges 4, 5, 9 or 10. Also the body 1 of the envelope may take other forms such as the conventional style envelope having a flap.

A sealing strip 12 is employed to close the opening 8 of the body of the envelope. The sealing strip 8 is provided with a suitable adhesive material 13, such as a pressure sensitive adhesive, on the back face thereof to affix it in closing relation with the opening 8 through the application of a slight amount of pressure. The adhesive material 13 must be such as to permit easy application and removal of the sealing strip 12 from the body 1 of the envelope. Although the adhesive material 13 is shown on the drawing as covering the entire back face of the sealing strip 12, it is apparent that the adhesive may be applied only to selected portions of the back face of the strip.

The front face of the sealing strip 12 provides a surface having a first area 14 to receive identification of the addressee for the envelope and a second area 15 to receive postage for the envelope. It is well understood that the strip may also contain other matter such as the address of the sender, etc. If the envelope is to be used where no postage is required such as for inter-office or inter-department correspondence, the entire front face of the sealing strip 12 may serve as an area to receive identification of the addressee, etc.

In use, material is inserted into the body 1 of the envelope through the opening 8 and the sealing strip 12 thereafter is affixed in closing relation to the opening, whereupon the mailing device may be forwarded to the addressee designated on the strip.

In use with a flap type envelope the sealing strip will be affixed in closing relation to the opening between the flap and the wall of the envelope which the flap overlies. The mailing device may be opened very easily by merely removing the sealing strip 12 from the envelope. Since all the writing and postage for the mailing device are contained on the sealing strip 12, the body of the envelope is not marked or stamped during usage. Consequently the removal of the sealing strip 12 leaves a clean reusable envelope ready for application of a fresh sealing strip in reusing the mailing device.

While the invention has been described with particular reference to a preferred specific embodiment, many other modifications may be made by persons skilled in the art without departing from the scope of the invention defined by the following claim.

I claim:
A mailing device comprising
a reusable plastic envelope,
said envelope comprising a one-piece blank folded to form a front wall and a back wall, said walls being fastened together along the marginal edges thereof,
the ends of said blank being in edge to edge abutment on one of said walls to define a longitudinal slit in said one wall forming an opening into said envelope extending across the entire width and spaced from the ends of said envelope, an easily removable sealing strip affixed on said one wall in closing relation substantially along the entire length of said opening, said strip being constructed of a material capable of receiving writing thereon to provide a writing surface on one face of said strip, said surface having a first area for receiving identification of the addressee for said envelope and a second area for receiving postage for said envelope so that said strip may be removed to leave a clean envelope ready for subsequent reuse by application of an unused sealing strip, said strip having a pressure sensitive adhesive material on the face opposite said one face thereof to affix it in a closing relation with said opening while still permitting said strip to be easily removed from said opening without damaging said envelope.

References Cited in the file of this patent

UNITED STATES PATENTS

| | | |
|---|---|---|
| 2,114,130 | Brate | April 12, 1938 |
| 2,308,527 | Look | Jan. 19, 1943 |
| 2,400,406 | Godoy | May 14, 1946 |
| 2,643,049 | Bartelt | June 23, 1953 |
| 2,962,157 | Meister | Nov. 29, 1960 |
| 3,057,471 | Stonehill et al. | Oct. 9, 1962 |

FOREIGN PATENTS

| | | |
|---|---|---|
| 687,896 | France | May 5, 1930 |